(12) United States Patent
Kakimoto

(10) Patent No.: US 8,169,712 B2
(45) Date of Patent: May 1, 2012

(54) ZOOM LENS AND IMAGE CAPTURING APPARATUS HAVING THE SAME

(75) Inventor: Tsuyoshi Kakimoto, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 50 days.

(21) Appl. No.: 12/878,209

(22) Filed: Sep. 9, 2010

(65) Prior Publication Data
US 2011/0058261 A1  Mar. 10, 2011

(30) Foreign Application Priority Data
Sep. 9, 2009 (KR) .................. 10-2009-0085072

(51) Int. Cl.
*G02B 15/14* (2006.01)

(52) U.S. Cl. ........................ 359/687; 359/683

(58) Field of Classification Search .................. 359/676, 359/683, 687
See application file for complete search history.

(56) References Cited

U.S. PATENT DOCUMENTS
7,738,185 B2 * 6/2010 Ohtake et al. ............... 359/687
2006/0291071 A1 * 12/2006 Ohtake ....................... 359/687
2007/0019303 A1 * 1/2007 Hamano et al. ............. 359/687

FOREIGN PATENT DOCUMENTS
JP  2002-365544 A  12/2002
JP  2007-017533 A   1/2007
JP  2008-209866 A   9/2008

* cited by examiner

*Primary Examiner* — Scott J Sugarman
(74) *Attorney, Agent, or Firm* — Drinker Biddle & Reath LLP

(57) ABSTRACT

A zoom lens system and an image capturing apparatus having the same. The zoom lens includes a first lens group having a positive refractive power; a second lens group having a negative refractive power; a third lens group having a positive refractive power; and a fourth lens group having a positive refractive power, wherein the first through fourth lens groups are sequentially arranged from an object side to an image side, and the third lens group includes a first positive lens, a doublet lens including a second positive lens and a third negative lens, and a fourth positive lens sequentially arranged from the object side.

19 Claims, 10 Drawing Sheets

ZOOM LENS AND IMAGE CAPTURING APPARATUS HAVING THE SAME

CROSS-REFERENCE TO RELATED PATENT APPLICATION

This application claims the benefit of Korean Patent Application No. 10-2009-0085072, filed on Sep. 9, 2009, in the Korean Intellectual Property Office, the disclosure of which is incorporated herein in its entirety by reference.

BACKGROUND

The invention relates to a zoom lens that is small and has a high magnification, and an image capturing apparatus employing the same.

Recently, digital cameras or video cameras having solid imaging devices, such as charge coupled devices (CCDs) and complementary metal oxide semiconductors (CMOSs), are becoming popular. Especially, due to demand for megapixel camera modules, inexpensive cameras with over 5 million pixels for providing high quality images are being released. Imaging optics apparatuses using CCDs or CMOSs, such as digital cameras or cellular phone cameras, are being developed to be smaller, to be lighter, and to have lower costs. Furthermore, demand for capturing a wider range image of object is increasing.

SUMMARY

The invention provides a zoom lens having a short overall length and a high magnification.

The invention also provides an image capturing apparatus employing a zoom lens having a short overall length and a high magnification.

According to an embodiment of the invention, there is provided a zoom lens including a first lens group having a positive refractive power; a second lens group having a negative refractive power; a third lens group having a positive refractive power; and a fourth lens group having a positive refractive power, wherein the first through fourth lens groups are sequentially arranged from an object side to an image side, the third lens group includes a first positive lens, a doublet lens including a second positive lens and a first negative lens, and a third positive lens sequentially arranged from the object side, the first through fourth lens groups are moveable when the zoom lens is zoomed from wide angle position to telephoto position, and the zoom lens satisfies the following equation:

$-0.6 < f2/(ft/fw) < -0.2$, where f2 indicates the focal length of the second lens group, fw indicates the focal length of the zoom lens at wide angle position, and ft indicates the focal length of the zoom lens at telephoto position.

The zoom lens may satisfy the following equation:

$0.7 < T1/T3 < 1.2$, where T1 indicates a distance that the first lens group moves along an optical axis when the zoom lens is zoomed from wide angle position to telephoto position, and T3 indicates a distance that the third lens group moves along the optical axis when the zoom lens is zoomed from wide angle position to telephoto position.

The zoom lens may satisfy the following equation:

$2 < f3/fw*\tan(m\omega) < 3$, where $m\omega$ indicates a half viewing angle at wide angle position.

According to another embodiment of the invention, there is provided an image capturing apparatus including a zoom lens; and an imaging device that receives light directed through the zoom lens, wherein the zoom lens includes a first lens group having a positive refractive power; a second lens group having a negative refractive power; a third lens group having a positive refractive power; and a fourth lens group having a positive refractive power, the first through fourth lens groups are sequentially arranged from an object side, the third lens group includes a first positive lens, a doublet lens including a second positive lens and a first negative lens, and a third positive lens sequentially arranged from the object side, the first through fourth lens groups are moveable when the zoom lens is zoomed from wide angle position to telephoto position, and the zoom lens satisfies the following equation:

$-0.6 < f2/(ft/fw) < -0.2$, where f2 indicates the focal length of the second lens group, fw indicates the focal length of the zoom lens at wide angle position, and ft indicates the focal length of the zoom lens at telephoto position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
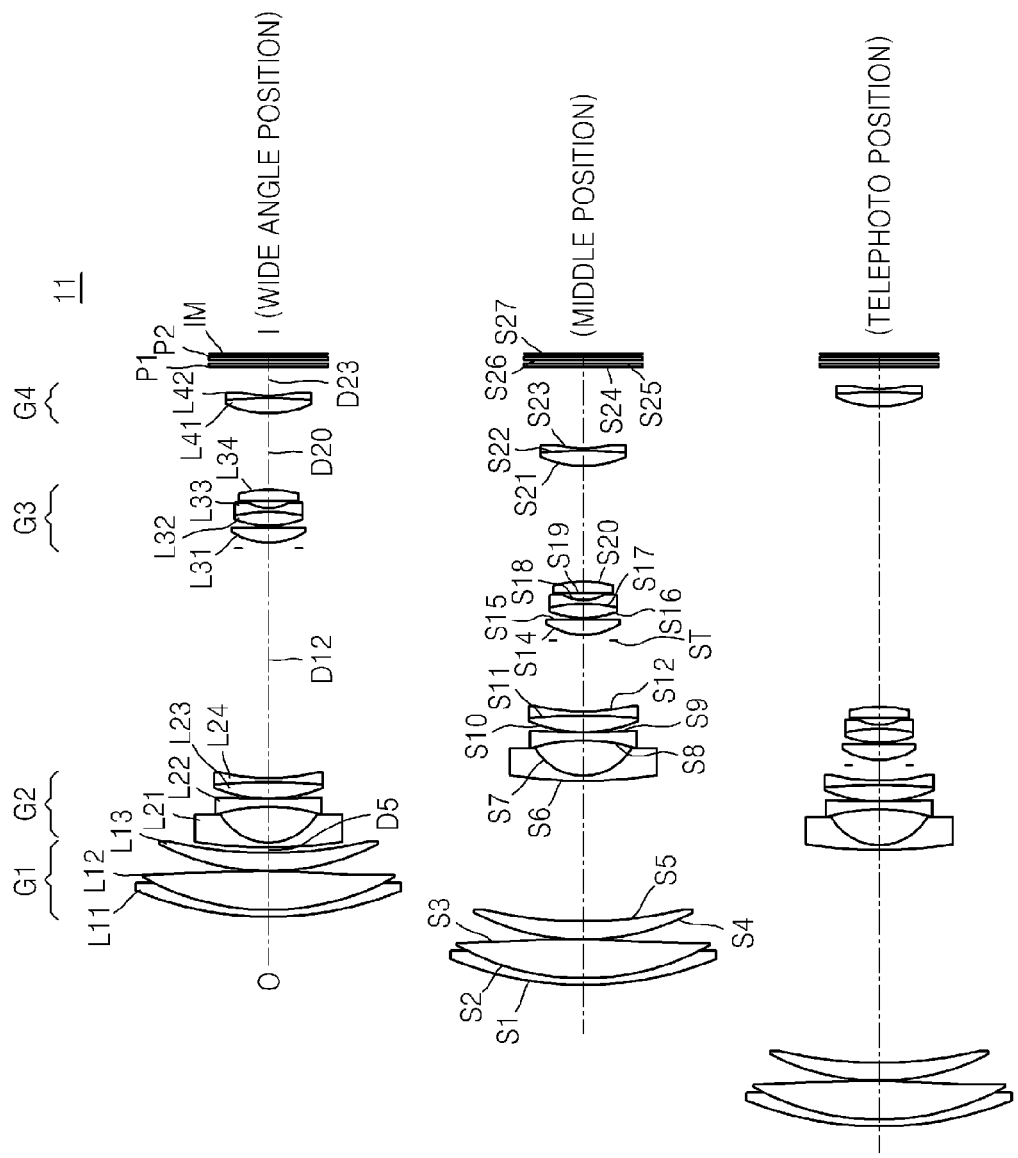
FIG. 1 is a diagram showing a zoom lens according to a first embodiment of the invention.

Referring to FIG. 1, a zoom lens 11 according to an embodiment of the invention includes a first lens group G1 having a positive refractive power, a second lens group G2 having a negative refractive power, a third lens group G3 having a positive refractive power, and a fourth lens group G4 having a positive refractive power. The first through fourth lens groups G1, G2, G3, and G4 are sequentially arranged from an object side O to an image side I.

When the zoom lens is zoomed from wide angle position to telephoto position, the first through fourth lens groups G1 through G4 may be moved. During zooming, the first lens group G1 and the third lens group G3 are moved toward the object side O. At the same time, the second lens group G2 is moved along a locus convex toward the image side I, and the fourth lens group G4 is moved along a locus convex toward the object side O.

A zoom lens according to an embodiment of the invention may have a magnification between 18× and 24×. The effective diameter of the first lens group G1 may be increased to increase the magnification. However, when the effective diameter of the first lens group G1 is increased, the first lens group G1 may become heavier, and thus the first lens group G1 may include a lesser number of lenses for weight reduction. The first lens group G1 may include first, second, and third lenses L11, L12, and L13. The first lens L11 may have a positive refractive power, the second lens L12 may have a negative refractive power, and the third lens L3 may have a negative refractive power. The first lens L11 and the second lens L12 may be formed as a doublet lens, and aberration may be corrected by using the first lens L11 and the second lens L12. Furthermore, the first lens group G1 may include a doublet lens and a positive lens to reduce spherical aberration and chromatic aberration which are caused while achieving a high magnification.

The second lens group G2 may include fourth, fifth, sixth, and seventh lenses L21, L22, L23, and L24. The fourth lens L21 may be a negative lens that has a meniscus shape convex toward the object side O. The fifth lens L22 may be a negative lens of which two surfaces are concave. The sixth lens L23 may have a positive refractive power, and the seventh lens L24 may have a negative refractive power. The sixth lens L23 and the seventh lens L24 may be formed as a doublet lens. The sixth lens L23 may be convex toward the object side O. The second lens group G2 may reduce variations in aberrations during zooming operations, and may correct distortion aberration at wide angle position or spherical aberration at telephoto position.

The third lens group G3 may include an eighth lens L31, a ninth lens L32, a tenth lens L33, and an eleventh lens L34. The eighth lens L31 may have a positive refractive power. The ninth lens L32 may have a positive refractive power, the tenth lens L33 may have a negative refractive power, and the eleventh lens L34 may have a positive refractive power. The ninth lens L32 and the tenth lens L33 may be formed as a doublet lens.

The eighth lens L31 corrects spherical aberration, and the ninth, tenth, and eleventh lenses L32, L33, and L34 distribute refractive power to reduce distortion aberration and lateral chromatic aberration.

For example, when the third lens group G3 includes a positive lens, a negative lens, and a positive lens, a light flux diversed by the second lens group G2 having a negative refractive power is incident on the third lens group G3, and thus it becomes difficult to correct spherical aberration. Furthermore, the third lens group G3 is required to have a (telescopic) refractive power to correct negative distortion aberration occurred in the second lens group G2. Thus, the positive lens closest to the object side O among the three lenses is to have a strong refractive power. However, it then becomes difficult to correct spherical aberration. Accordingly, if the third lens group G3 includes three lenses, it is difficult to correct spherical aberration and distortion aberration, and it is difficult to embody the zoom lens having reduced size and higher performance.

Therefore the third lens group G3 may include four lenses for improved spherical aberration correction, distortion correction, and lateral chromatic aberration correction. Furthermore, the overall refractive power of the third lens group G3 may be distributed to two of the four lenses closest to the object side, and thus an increase in the size of the zoom lens due to increasing refractive power may be reduced.

A positive lens closest to the object side O among the lenses of the third lens group G3 may include at least one aspherical surface. For example, a surface of the eighth lens L31 facing the object side O may be an aspherical surface. Thus, the spherical aberration and coma aberration that occurred in the third lens group G3 may be corrected, and the overall refractive power of the third lens group G3 may be increased. As a result, the size of the zoom lens may be reduced. A stop ST may be disposed on the object side O of the third lens group G3.

In a zoom lens according to an embodiment of the invention, the third lens group G3 moves in a direction perpendicular to an optical axis for correcting a hand shake. Furthermore, vibration is controlled without using an optical component (e.g. a prism) or a lens group for vibration control, and thus an increase in the size of the entire zoom lens optics is reduced.

The fourth lens group G4 may include a twelfth lens L41 and a thirteenth lens L42. The twelfth lens L41 may have a positive refractive power, whereas the thirteen lens L42 may have a negative refractive power. The twelfth lens L41 and the thirteenth lens L42 may be formed as a doublet lens.

A zoom lens according to an embodiment of the invention may satisfy an equation 1 described below.

$$-0.6 < f2/(ft/fw) < -0.2 \qquad (1)$$

Here:
f2 indicates the focal length of the second lens group G2,
fw indicates the focal length of the zoom lens at wide angle position, and
ft indicates the focal length of the zoom lens at telephoto position.

When f2/(ft/fw) exceeds the upper limit of the equation 1, both the overall length of the zoom lens and the focal length of the second lens group G2 are decreased. Thus, it becomes difficult to correct aberration and distortion aberration during zooming operations. When f2/(ft/fw) is less than the lower limit of the equation 1, the distance that the second lens group G2 is moved is increased. As a result, the overall length of the zoom lens is increased, and thus it becomes more difficult to reduce the size of the zoom lens.

A zoom lens according to an embodiment of the invention may satisfy an Equation 2 described below.

$$0.7 < T1/T3 < 1.2 \qquad (2)$$

Here:
T1 indicates a distance that the first lens group G1 moves along the optical axis when the zoom lens is zoomed from wide angle position to telephoto position, and
T3 indicates a distance that the third lens group G3 moves along the optical axis when the zoom lens is zoomed from wide angle position to telephoto position.

When T1/T3 exceeds the upper limit of Equation 2, the distance that the first lens group G1 moves is increased and the interval between the first lens group G1 and the second lens group G2 at wide angle position is increased. Therefore, the overall length of the zoom lens is increased, and thus it becomes more difficult to reduce the size of the zoom lens. When T1/T3 is less than the lower limit of Equation 2, the distance that the third lens group G3 moves is increased and distance from an entrance pupil of the twelfth lens L41, which is the closest to the object side O of the fourth lens group G4, at wide angle position is increased. Thus, the overall lens length increases.

A zoom lens according to an embodiment of the invention may satisfy an Equation 3 described below.

$$2 < f3/fw*\tan(m\omega) < 3 \qquad (3)$$

Here, f3 indicates the focal length of the third lens group, fw indicates the focal length of the zoom lens at wide angle position, and mω indicates a half viewing angle at wide angle position.

When f3/fw*tan(mω) exceeds the upper limit of Equation 3, it is necessary to increase the refractive power of the second lens group G2 or the fourth lens group G4 for higher magnification. However, if the refractive power of the second lens group G2 or the fourth lens group G4 increases, it becomes difficult to correct coma aberration or astigmatism at telephoto position. When f3/fw*tan(mω) is less than the lower limit of Equation 3, the refractive power of the third lens group G3 increases, and it becomes difficult to correct aberration during zooming operations. As a result, it becomes difficult to secure optical performance. Furthermore, aberration varies more significantly when the third lens group G3 moves in a direction perpendicular to the optical axis for correcting a hand shake.

The term "aspherical" used in embodiments of the invention is defined as below.

In the aspherical shape of a zoom lens according to an embodiment of the invention, when a light travelling direction is referred as a positive direction, z indicates displacement from the vertex along the optical axis, (h indicates a distance in a direction perpendicular to the optical axis direction from the optical axis), c indicates curvature, k indicates a conic constant, and A, B, C, and D indicate deformation terms, z of an aspherical surface is defined as described below in Equation 4.

$$z = \frac{ch^2}{1 + \sqrt{(1-(1+k)c^2h^2)}} + Ah^4 + Bh^6 + Ch^8 + Dh^{10} \quad (4)$$

Hereinafter, various designs according to embodiments of the invention will be described.

In each of drawings, the rightmost straight line indicates the position of an image plane IM, and either an infrared ray (IR) blocking filter P1 or a cover glass P2, or both, of an imaging device is disposed on the object side of the image plane IM. Hereinafter, lens data, aspherical surface data, and focal length f, F number FNo, viewing angle 2ω, the overall length L of a zoom lens, and variable distances D5, D12, D20, and D23 between lenses according to first, second, and third embodiments will be shown.

First Embodiment

Figure 2A:
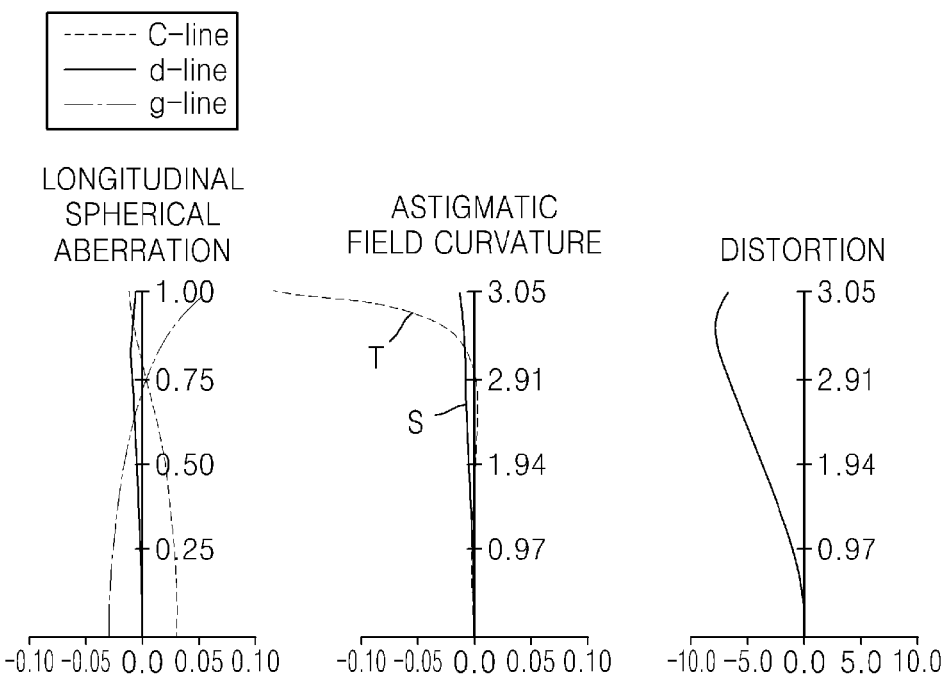
FIGS. 2A, 2B, and 2C are graphs of aberrations of the zoom lens according to the first embodiment of the invention at wide angle position, middle position, and telephoto position, respectively.
Figure 2B:
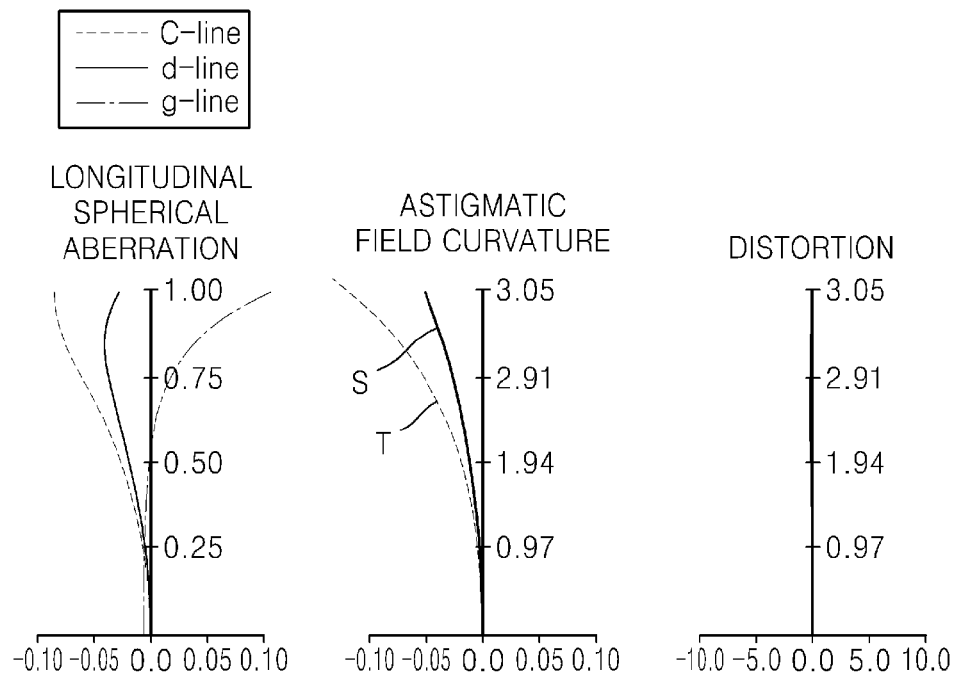
Figure 2C:
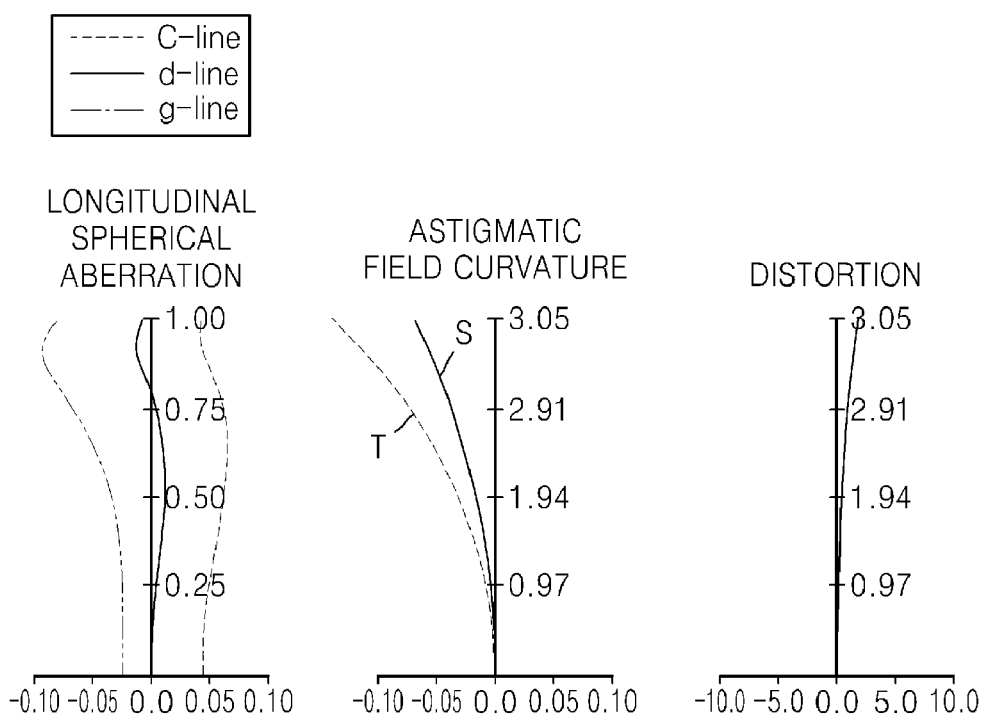

FIG. 1 is a diagram showing a zoom lens according to a first embodiment of the invention. FIGS. 2A, 2B, and 2C are graphs of aberrations of the zoom lens according to the first embodiment of the invention at wide angle position, middle position, and telephoto position, respectively.

TABLE 1

| Lens Surface | Curvature | Thickness | Refractive Index | Abbe Number |
|---|---|---|---|---|
| S1 | 45.506 | 1.00 | 1.92286 | 20.9 |
| S2 | 34.536 | 5.16 | 1.49700 | 81.6 |
| S3 | −233.840 | 0.15 | | |
| S4 | 30.774 | 2.47 | 1.60311 | 60.7 |
| S5 | 62.692 | D5 | | |
| S6 | 62.692 | 0.80 | 1.90366 | 31.3 |
| S7 | 7.522 | 4.88 | | |
| S8 | −21.836 | 1.00 | 1.77250 | 49.6 |
| S9 | 90.485 | 0.10 | | |
| S10 | 16.965 | 2.16 | 1.94595 | 18.0 |
| S11 | −126.186 | 0.80 | 1.83481 | 42.7 |
| S12 | 32.276 | D12 | | |
| S13 | Infinity | 1.00 | | |
| S14 | 9.110 | 1.94 | 1.80470 | 40.9 |
| S15 | 300.000 | 0.34 | | |
| S16 | 12.003 | 1.90 | 1.49700 | 81.6 |

TABLE 1-continued

| Lens Surface | Curvature | Thickness | Refractive Index | Abbe Number |
|---|---|---|---|---|
| S17 | −15.625 | 0.50 | 1.80610 | 33.3 |
| S18 | 7.236 | 0.85 | | |
| S19 | 28.215 | 1.63 | 1.49700 | 81.6 |
| S20 | −18.581 | D20 | | |
| S21 | 11.954 | 2.19 | 1.48749 | 70.4 |
| S22 | −48.920 | 0.60 | 1.76182 | 26.6 |
| S23 | 98.581 | D23 | | |
| S24 | Infinity | 0.30 | 1.51680 | 64.2 |
| S25 | Infinity | 0.30 | | |
| S26 | Infinity | 0.50 | 1.51680 | 64.2 |
| S27 | Infinity | | | |

TABLE 2

Deformation Terms

| S14 | |
|---|---|
| K | −1.45836E−02 |
| A | −5.14250E−05 |

TABLE 3

| | Wide angle position | Middle position | Telephoto position |
|---|---|---|---|
| Focal length | 4.91 | 25.00 | 111.02 |
| FNo | 2.80 | 3.82 | 5.91 |
| 2ω | 76.58 | 17.62 | 4.00 |
| L | 78.00 | 87.37 | 107.00 |
| Variable Distances | | | |
| D5 | 0.70 | 19.78 | 29.77 |
| D12 | 31.56 | 9.34 | 1.50 |
| D20 | 10.60 | 16.32 | 41.57 |
| D23 | 4.18 | 10.96 | 3.20 |

Second Embodiment

Figure 3:
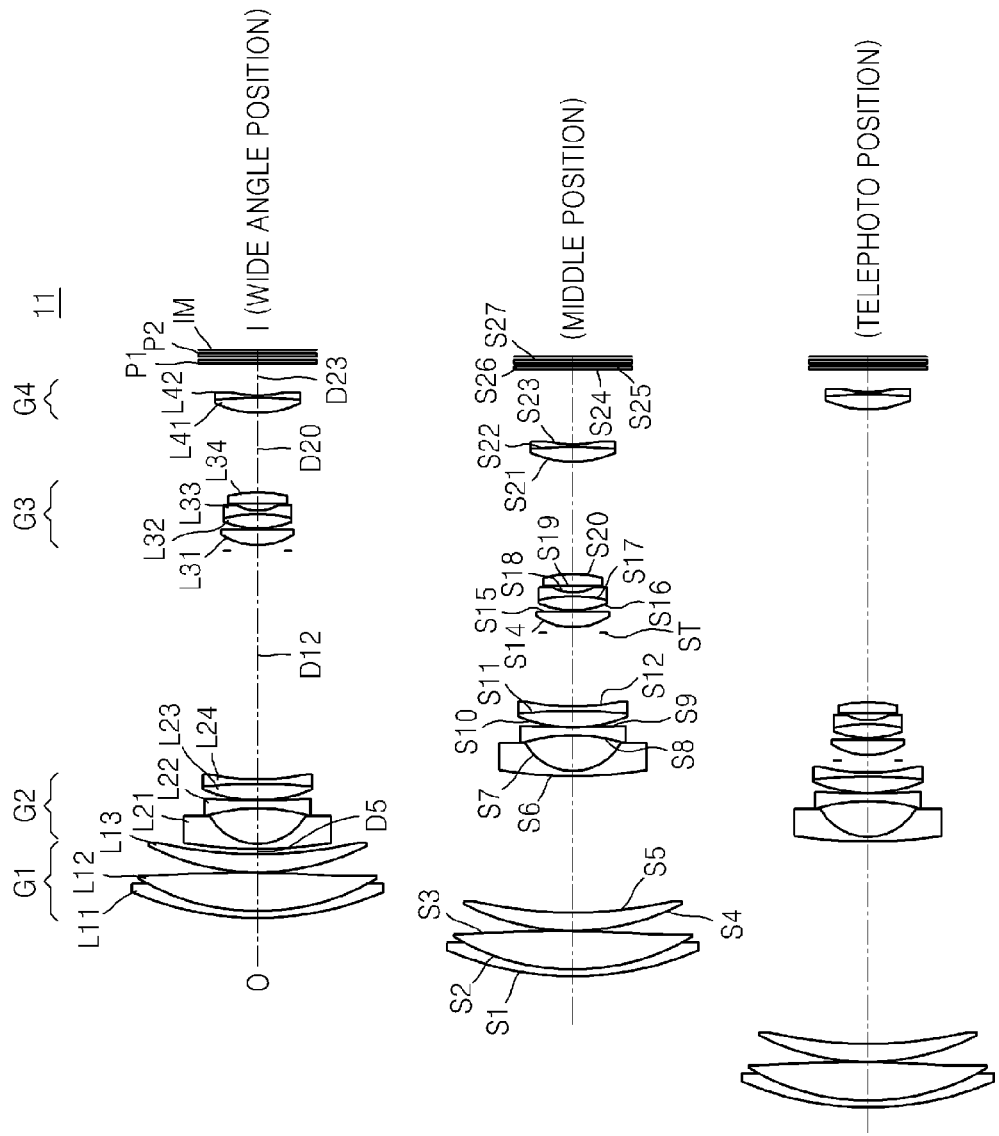
FIG. 3 is a diagram showing a zoom lens according to a second embodiment of the invention.
Figure 4A:
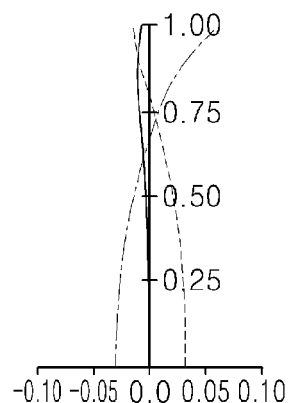
FIGS. 4A, 4B, and 4C are graphs of aberrations of the zoom lens according to the second embodiment of the invention at wide angle position, middle position, and telephoto position, respectively.
Figure 4A:
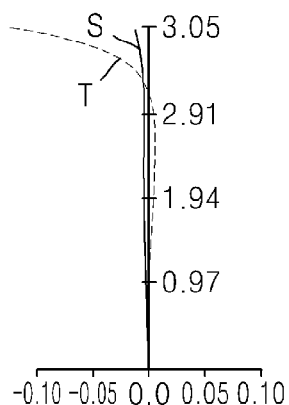
Figure 4A:
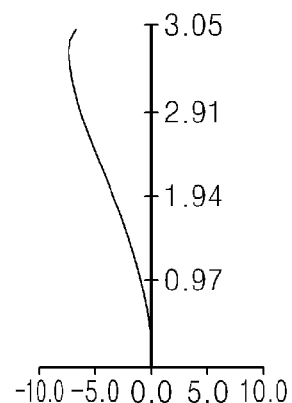
Figure 4B:
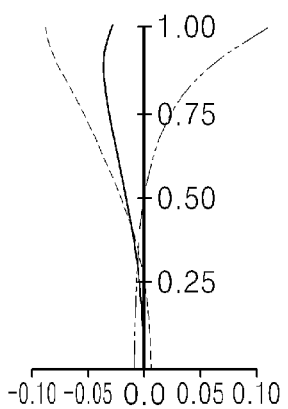
Figure 4B:
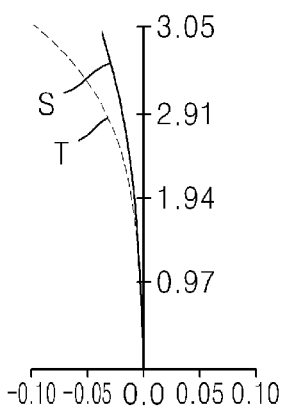
Figure 4B:
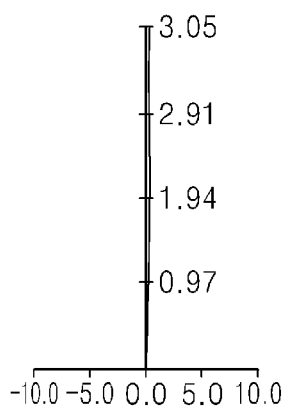
Figure 4C:
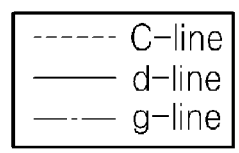
Figure 4C:
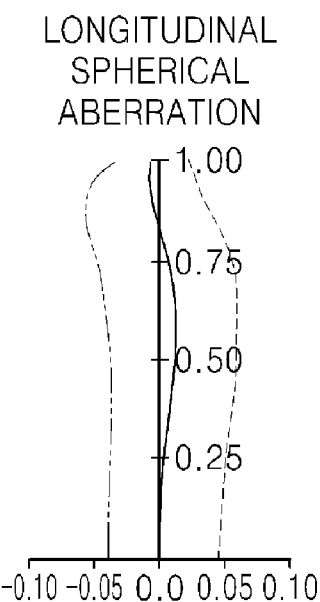
Figure 4C:
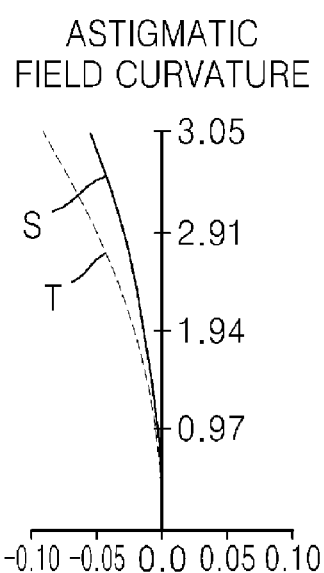
Figure 4C:
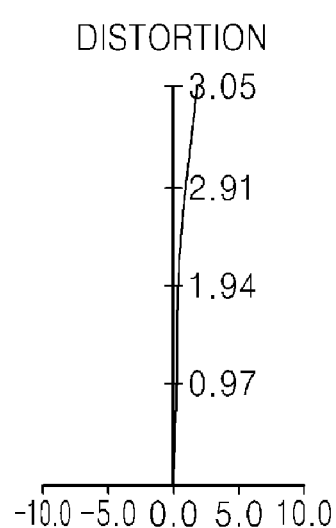

FIG. 3 is a diagram showing a zoom lens according to a second embodiment of the invention. FIGS. 4A, 4B, and 4C are graphs of aberrations of the zoom lens according to the second embodiment of the invention at wide angle position, middle position, and telephoto position, respectively.

TABLE 4

| Lens Surface | Curvature | Thickness | Refractive Index | Abbe Number |
|---|---|---|---|---|
| S1 | 44.461 | 1.00 | 1.92286 | 20.9 |
| S2 | 33.762 | 4.78 | 1.49700 | 81.6 |
| S3 | −234.563 | 0.15 | | |
| S4 | 30.672 | 2.58 | 1.60311 | 60.7 |
| S5 | 66.369 | D5 | | |
| S6 | 66.294 | 0.80 | 1.90366 | 31.3 |
| S7 | 7.642 | 4.82 | | |
| S8 | −20.824 | 1.00 | 1.77250 | 49.6 |
| S9 | 123.501 | 0.10 | | |
| S10 | 17.636 | 2.12 | 1.94595 | 18.0 |
| S11 | −112.948 | 0.80 | 1.83481 | 42.7 |
| S12 | 35.497 | D12 | | |
| S13 | Infinity | 1.00 | | |
| S14 | 9.110 | 1.94 | 1.80470 | 40.9 |
| S15 | 300.000 | 0.37 | | |
| S16 | 12.263 | 1.90 | 1.49700 | 81.6 |
| S17 | −15.189 | 0.50 | 1.80610 | 33.3 |
| S18 | 7.331 | 0.85 | | |
| S19 | 36.798 | 1.59 | 1.49700 | 81.6 |

TABLE 4-continued

| Lens Surface | Curvature | Thickness | Refractive Index | Abbe Number |
|---|---|---|---|---|
| S20 | −17.021 | D20 | | |
| S21 | 12.184 | 2.08 | 1.48749 | 70.4 |
| S22 | −67.112 | 0.60 | 1.76182 | 26.6 |
| S23 | 81.839 | D23 | | |
| S24 | Infinity | 0.30 | 1.51680 | 64.2 |
| S25 | Infinity | 0.30 | | |
| S26 | Infinity | 0.50 | 1.51680 | 64.2 |
| S27 | Infinity | | | |

TABLE 5

Deformation Terms

S14

| K | −2.82982E−03 |
|---|---|
| A | −5.49988E−05 |

TABLE 6

| | Wide angle position | Middle position | Telephoto position |
|---|---|---|---|
| Focal length | 5.15 | 25.00 | 106.70 |
| FNo | 2.87 | 3.81 | 5.96 |
| 2ω | 73.92 | 17.62 | 4.16 |
| L | 78.52 | 86.18 | 104.00 |
| Variable Distances | | | |
| D5 | 0.70 | 18.98 | 28.04 |
| D12 | 32.00 | 10.10 | 1.50 |
| D20 | 10.85 | 15.74 | 40.44 |
| D23 | 4.48 | 10.87 | 3.53 |

Third Embodiment

Figure 5:
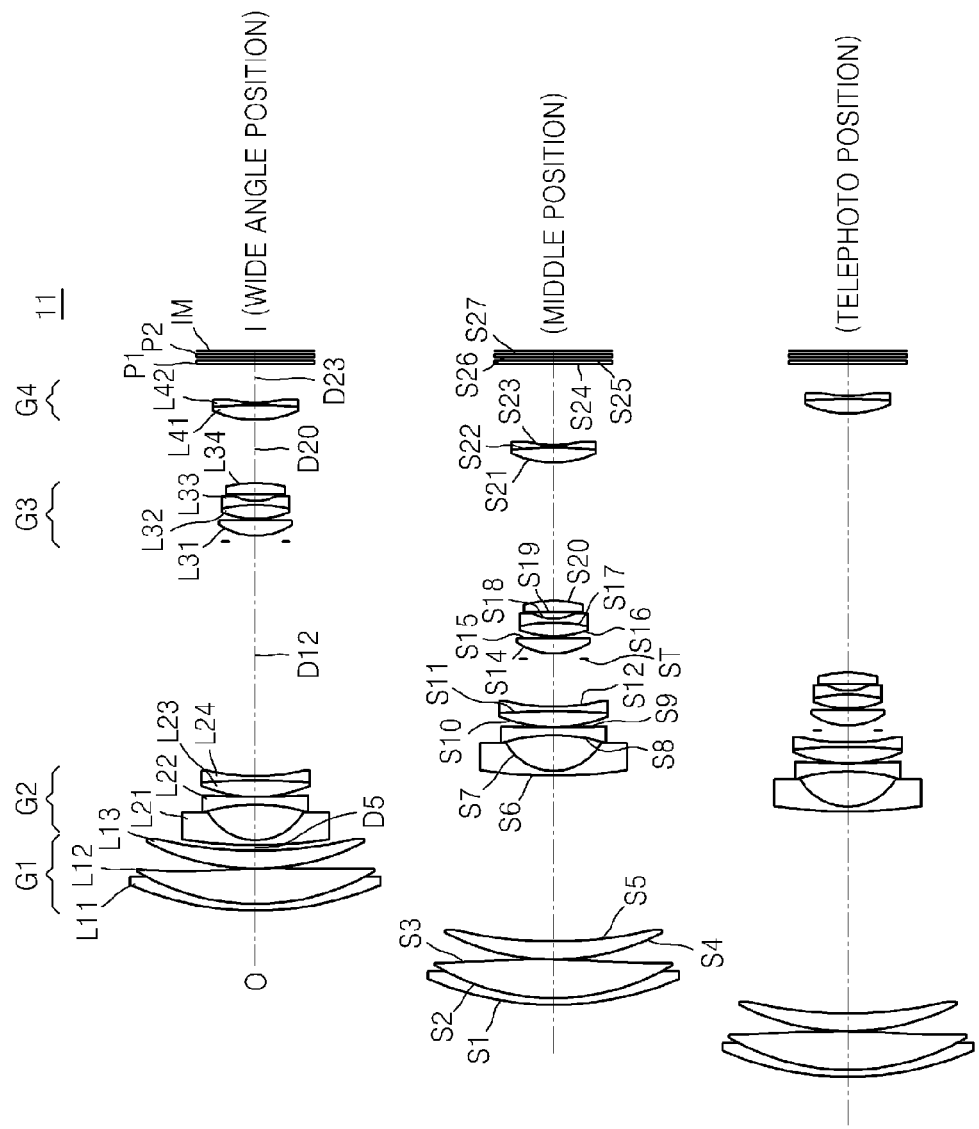
FIG. 5 is a diagram showing a zoom lens according to a third embodiment of the invention.
Figure 6A:
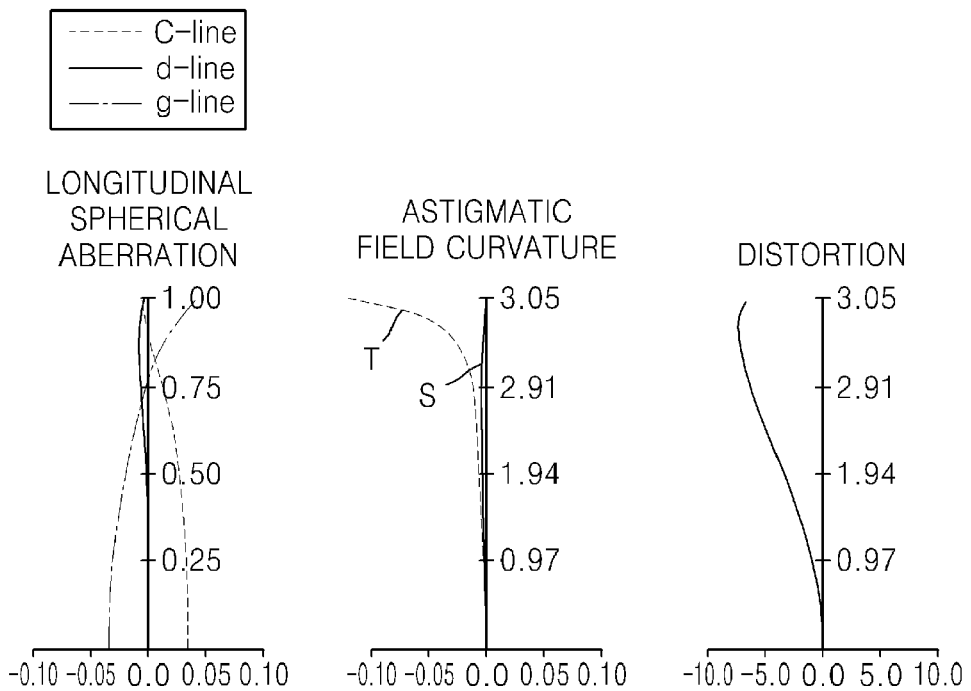
FIGS. 6A, 6B, and 6C are graphs of aberrations of the zoom lens according to the third embodiment of the invention at wide angle position, middle position, and telephoto position, respectively.
Figure 6B:
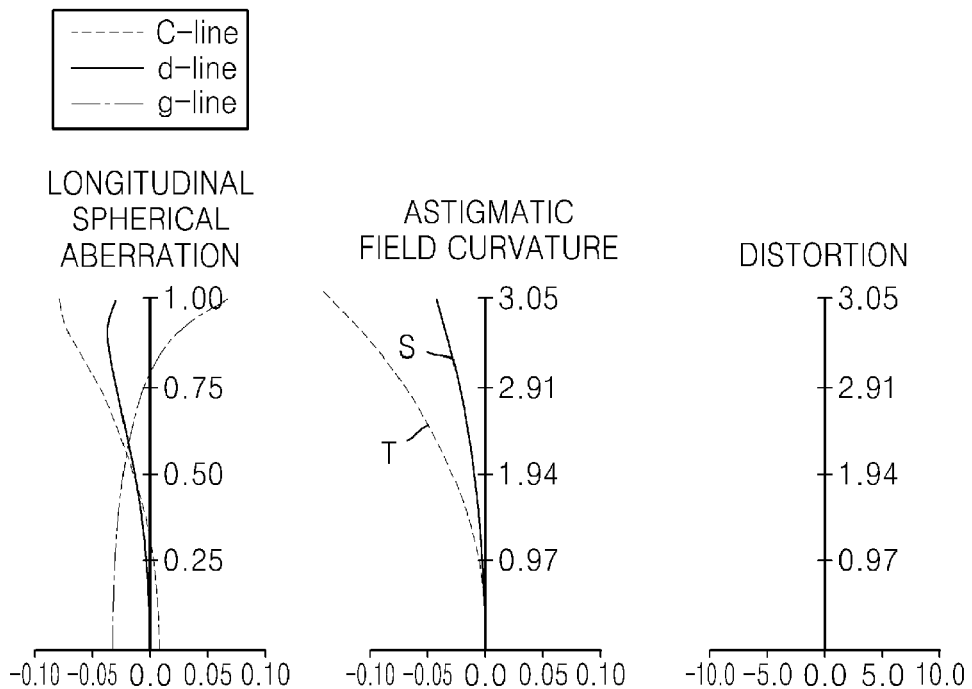
Figure 6C:
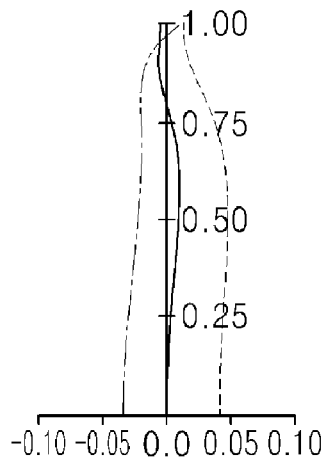
Figure 6C:
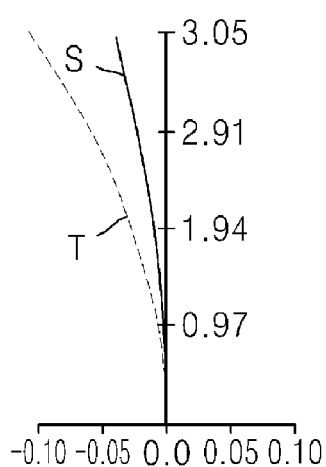
Figure 6C:
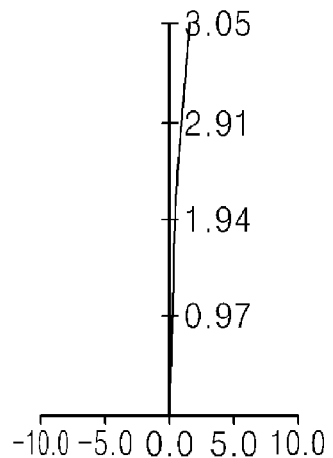

FIG. 5 is a diagram showing a zoom lens according to a third embodiment of the invention. FIGS. 6A, 6B, and 6C are graphs of aberrations of the zoom lens according to the third embodiment of the invention at wide angle position, middle position, and telephoto position, respectively.

TABLE 7

| Lens Surface | Curvature | Thickness | Refractive Index | Abbe Number |
|---|---|---|---|---|
| S1 | 47.395 | 1.00 | 1.92286 | 20.9 |
| S2 | 35.358 | 4.76 | 1.49700 | 81.6 |
| S3 | −215.022 | 0.15 | | |
| S4 | 31.701 | 2.71 | 1.60311 | 60.7 |
| S5 | 75.692 | D5 | | |
| S6 | 75.692 | 0.80 | 1.90366 | 31.3 |
| S7 | 7.759 | 4.54 | | |
| S8 | −22.431 | 1.00 | 1.77250 | 49.6 |
| S9 | 67.447 | 0.28 | | |
| S10 | 18.448 | 2.19 | 1.94595 | 18.0 |
| S11 | −111.660 | 0.80 | 1.83481 | 42.7 |
| S12 | 51.757 | D12 | | |
| S13 | Infinity | 1.00 | | |
| S14 | 8.858 | 1.80 | 1.80470 | 40.9 |
| S15 | 155.538 | 0.50 | | |
| S16 | 9.426 | 1.96 | 1.49700 | 81.6 |
| S17 | −15.183 | 0.50 | 1.80610 | 33.3 |
| S18 | 6.453 | 0.89 | | |
| S19 | 33.199 | 1.61 | 1.49700 | 81.6 |
| S20 | −21.404 | D20 | | |
| S21 | 12.594 | 2.06 | 1.58913 | 61.3 |
| S22 | −78.728 | 0.60 | 1.69895 | 30.1 |

TABLE 7-continued

| Lens Surface | Curvature | Thickness | Refractive Index | Abbe Number |
|---|---|---|---|---|
| S23 | 38.380 | D23 | | |
| S24 | Infinity | 0.30 | 1.51680 | 64.2 |
| S25 | Infinity | 0.30 | | |
| S26 | Infinity | 0.50 | 1.51680 | 64.2 |
| S27 | Infinity | | | |

TABLE 8

Deformation Terms

S14

| K= | −6.47724E−02 |
|---|---|
| A= | −2.74703E−05 |
| B= | 2.89363E−07 |
| C= | 4.49521E−09 |

TABLE 9

| | Wide angle position | Middle position | Telephoto position |
|---|---|---|---|
| Focal length | 5.15 | 40.00 | 97.06 |
| FNo | 2.86 | 4.32 | 5.95 |
| 2ω | 73.97 | 11.07 | 4.57 |
| L | 77.28 | 90.13 | 100.00 |
| Variable Distances | | | |
| D5 | 0.70 | 23.16 | 28.00 |
| D12 | 32.00 | 6.60 | 1.50 |
| D20 | 8.81 | 18.92 | 35.78 |
| D23 | 5.12 | 10.81 | 4.07 |

In graphs showing longitudinal spherical aberrations according to the first through third embodiments of the invention, the vertical axis indicates FNo, and the spherical aberrations with respect to C_line (656.3 nm), d-line (587.6 nm), and g-line (435.8 nm) are shown. In graphs showing astigmatic field curvatures, the vertical axis indicates the maximum height IH of an image, a solid line indicates sagittal field curvatures S, and a broken line indicates tangential field curvatures T. In graphs showing distortion aberrations, the vertical axis indicates the maximum height IH of an image.

Table 10 below shows that zoom lenses according to the first through third embodiments of the invention satisfy conditions of Equations 1, 2, and 3 described above.

TABLE 10

| equations | First Embodiment | Second Embodiment | Third Embodiment |
|---|---|---|---|
| f 2/(f t/f w) | −0.35 | −0.39 | −0.45 |
| T 1/T 3 | 0.97 | 0.89 | 0.88 |
| f 3/f w * t a n (mw) | 2.68 | 2.52 | 2.52 |

A zoom lens according to an embodiment of the invention has a high magnification and small size. Furthermore, a zoom lens according to an embodiment of the invention may be used for capturing an image at a wide angle equal to or wider than 70 degrees. A zoom lens according to an embodiment of the invention may be applied to a digital still camera, a digital video camera, or a portable digital apparatus using a solid imaging device, such as a charge-coupled device (CCD) or a complementary metal-oxide semiconductor (CMOS). A zoom lens according to an embodiment of the invention has a wide angle of view, and thus wider range images of objects may be captured.

Figure 7:
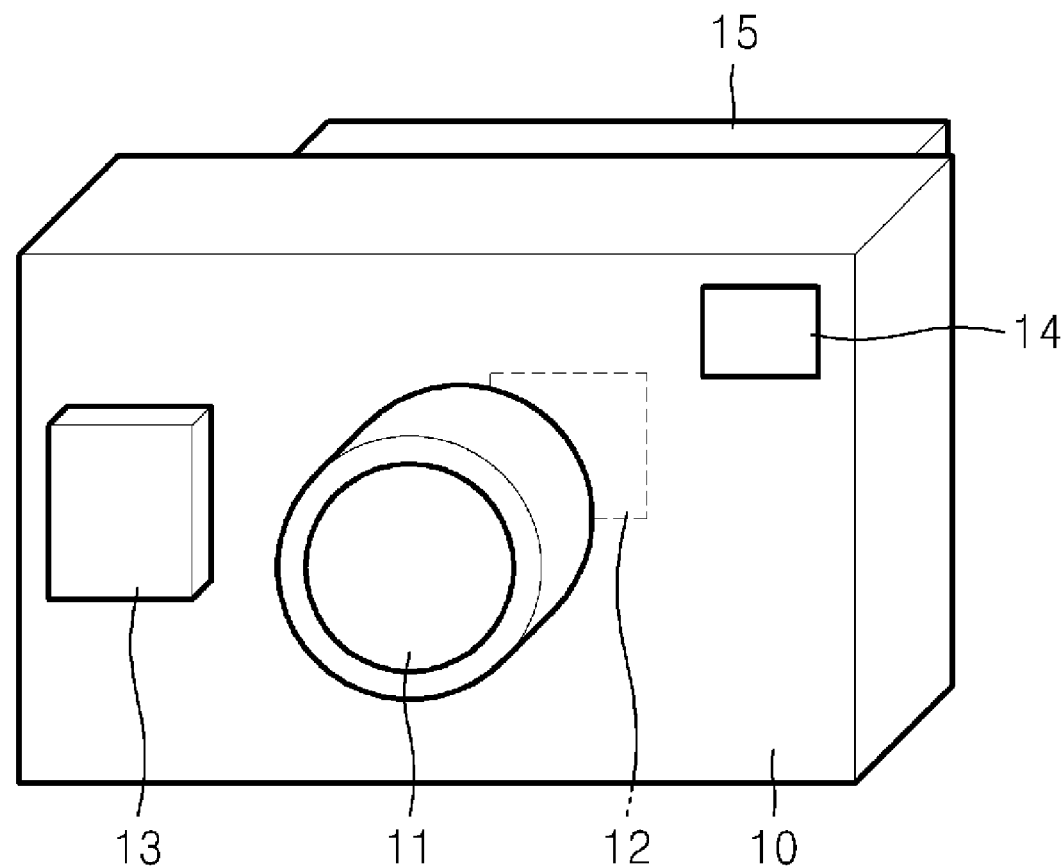
FIG. 7 is a diagram showing an image capturing apparatus including a zoom lens according to an embodiment of the invention.

FIG. 7 is a diagram showing an image capturing apparatus including a zoom lens according to an embodiment of the invention. The image capturing apparatus includes a zoom lens 11 as described in the above embodiments and an imaging device 12 that may receives light directed through the zoom lens 11. The image capturing apparatus may include a recording medium 13 that may store data corresponding to an object image photo-electrically converted by the imaging device 12, and a viewfinder 14 for observing the object image. Furthermore, the image capturing apparatus may include a display unit 15 on which a object image may be displayed. The image capturing apparatus shown in FIG. 7 is merely an example, and the invention is not limited thereto, and the invention may be applied to various optical apparatuses. Accordingly, a small optical apparatus that has a high magnification and is capable of capturing a wide angle image of a object may be embodied by applying a zoom lens according to an embodiment of the invention to an image capturing apparatus such as a digital camera.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A zoom lens comprising:
   a first lens group having a positive refractive power;
   a second lens group having a negative refractive power;
   a third lens group having a positive refractive power; and
   a fourth lens group having a positive refractive power,
   wherein:
   the first through fourth lens groups are sequentially arranged from an object side to an image side,
   the third lens group comprises a first positive lens, a doublet lens including a second positive lens and a third negative lens, and a fourth positive lens sequentially arranged from the object side,
   the first through fourth lens groups are moveable when the zoom lens is zoomed from wide angle position to telephoto position, and
   the zoom lens satisfies the following equation:

$-0.6 < f2/(ft \cdot fw) < -0.2$, where f2 indicates the focal length of the second lens group,
   fw indicates the focal length of the zoom lens at wide angle position, and
   ft indicates the focal length of the zoom lens at telephoto position.

2. The zoom lens of claim 1, satisfying the following equation:

$0.7 < T1/T3 < 1.2$, where

T1 indicates a distance that the first lens group moves along an optical axis when the zoom lens is zoomed from wide angle position to telephoto position, and
   T3 indicates a distance that the third lens group moves along the optical axis when the zoom lens is zoomed from wide angle position to telephoto position.

3. The zoom lens of claim 1, satisfying the following equation:

$2 < f3/fw \cdot \tan(m\omega) < 3$, where f3 indicates the focal length of the third lens group, fw indicates the focal length of the zoom lens at wide angle position, and mω indicates a half viewing angle at wide angle position.

4. The zoom lens of claim 1, wherein the third lens group is moveable in a direction perpendicular to an optical axis for correcting a hand shake.

5. The zoom lens of claim 1, wherein the first positive lens of the third lens group comprises at least one aspherical surface.

6. The zoom lens of claim 1, wherein the first lens group and the third lens group move toward the object side during zooming operations.

7. The zoom lens of claim 6, wherein the second lens group is movable along a locus convex toward the image side, and the fourth lens group is movable along a locus convex toward the object side.

8. The zoom lens of claim 1, having a magnification between 18× and 24×.

9. The zoom lens of claim 1, wherein the first lens group comprises a fifth positive lens, a sixth negative lens, and a seventh negative lens.

10. The zoom lens of claim 1, wherein the second lens group comprises a eighth negative lens, a ninth negative lens, a tenth positive lens, and a eleventh negative lens.

11. The zoom lens of claim 10, wherein the sixth positive lens and the seventh negative lens are formed as a doublet lens.

12. The zoom lens of claim 1, wherein the fourth lens group comprises an eighth positive lens and a ninth negative lens.

13. The zoom lens of claim 12, wherein the eighth positive lens and the ninth negative lens are formed as a doublet lens.

14. An image capturing apparatus comprising:
a zoom lens; and
an imaging device that receives light directed through the zoom lens,
wherein:
the zoom lens comprises:
a first lens group having a positive refractive power;
a second lens group having a negative refractive power;
a third lens group having a positive refractive power; and
a fourth lens group G4 having a positive refractive power,
the first through fourth lens groups are sequentially arranged from an object side,
the third lens group comprises a first positive lens, a doublet lens including a second positive lens and a third negative lens, and a fourth positive lens sequentially arranged from the object side,
the first through fourth lens groups are movable when the zoom lens is zoomed from wide angle position to telephoto position, and
the zoom lens satisfies the following equation:

$-0.6 < f2/(ft/fw) < -0.2$, where f2 indicates the focal length of the second lens group,
fw indicates the focal length of the zoom lens at wide angle position, and
ft indicates the focal length of the zoom lens at telephoto position.

15. The image capturing apparatus of claim 14, satisfying the following equation:

$0.7 < T1/T3 < 1.2$, where

T1 indicates a distance that the first lens group moves along an optical axis when the zoom lens is zoomed from wide angle position to telephoto position, and
T3 indicates a distance that the third lens group moves along the optical axis when the zoom lens is zoomed from wide angle position to telephoto position.

16. The image capturing apparatus of claim 14, satisfying the following equation:

$2 < f3/fw * \tan(m\omega) < 3$, where f3 indicates the focal length of the third lens group, fw indicates the focal length of the zoom lens at wide angle position, and mω indicates a half viewing angle at wide angle position.

17. The image capturing apparatus of claim 14, wherein the first positive lens of the third lens group comprises at least one aspherical surface.

18. The image capturing apparatus of claim 14, wherein the first lens group and the third lens group are movable toward the object side during zooming operations.

19. The image capturing apparatus of claim 18, wherein the second lens group is movable along a locus convex toward the image, and the fourth lens group is movable along a locus convex toward the object side.

* * * * *